US011109051B2

(12) United States Patent
Van Leuven et al.

(10) Patent No.: US 11,109,051 B2
(45) Date of Patent: Aug. 31, 2021

(54) MOTION COMPENSATION USING TEMPORAL PICTURE INTERPOLATION

(71) Applicant: Magic Pony Technology Limited, London (GB)

(72) Inventors: Sebastiaan Van Leuven, London (GB); Jose Caballero, London (GB); Zehan Wang, London (GB); Robert David Bishop, London (GB)

(73) Assignee: Magic Pony Technology Limited, London (GB)

( * ) Notice: Subject to any disclaimer, the term of this patent is extended or adjusted under 35 U.S.C. 154(b) by 0 days.

(21) Appl. No.: 15/855,735

(22) Filed: Dec. 27, 2017

(65) Prior Publication Data

US 2018/0124422 A1    May 3, 2018

Related U.S. Application Data

(63) Continuation of application No. PCT/GB2017/000056, filed on Apr. 13, 2017.

(30) Foreign Application Priority Data

Apr. 15, 2016 (GB) .................................. 1606682
May 5, 2016 (GB) .................................. 1607884

(51) Int. Cl.
*H04N 19/513* (2014.01)
*H04N 19/176* (2014.01)
(Continued)

(52) U.S. Cl.
CPC ........... *H04N 19/513* (2014.11); *G06T 9/002* (2013.01); *G06T 9/004* (2013.01); *H04N 19/176* (2014.11);
(Continued)

(58) Field of Classification Search
CPC ....... G06T 9/002; G06T 9/004; H04N 19/176; H04N 19/31; H04N 19/51; H04N 19/513; H04N 19/587
See application file for complete search history.

(56) References Cited

U.S. PATENT DOCUMENTS 9,473,775 B2 * 10/2016 Hagai .................... H04N 19/00
9,510,020 B2    11/2016 Van Der Auwera et al.
(Continued)

FOREIGN PATENT DOCUMENTS

EP    1246131 A2    10/2002
EP    1450565 A1    8/2004
(Continued)

OTHER PUBLICATIONS

International Search Report and Written Opinion for International Application PCT/GB2017/000056, dated Jul. 4, 2017, 19 pages.
(Continued)

*Primary Examiner* — Joon Kwon
(74) *Attorney, Agent, or Firm* — Brake Hughes Bellermann LLP

(57) ABSTRACT

The present disclosure relates to the use of hierarchical algorithms to temporally interpolate enhanced reference pictures for use in video encoding and decoding. According to a first aspect, there is provided a method of generating enhanced reference pictures in a video encoding and/or decoding process, the method comprising: receiving one or more known reference elements of video data from a reference picture buffer; generating, using one or more hierarchical algorithms, one or more additional reference elements of video data from the one or more known reference elements of video data; and outputting the one or more additional reference elements of video data; wherein the generating the one or more additional reference elements of
(Continued)

video data from the one or more known reference elements of video data comprises the use of temporal interpolation.

20 Claims, 7 Drawing Sheets

(51) Int. Cl.
*H04N 19/31* (2014.01)
*H04N 19/587* (2014.01)
*G06T 9/00* (2006.01)
*H04N 19/51* (2014.01)

(52) U.S. Cl.
CPC ............ *H04N 19/31* (2014.11); *H04N 19/51* (2014.11); *H04N 19/587* (2014.11)

(56) References Cited

U.S. PATENT DOCUMENTS

| | | | |
|---|---|---|---|
| 10,212,419 B2 | 2/2019 | Hinz et al. | |
| 10,523,955 B2 | 12/2019 | Wang et al. | |
| 2004/0234143 A1* | 11/2004 | Hagai | H04N 19/105 382/238 |
| 2004/0247190 A1* | 12/2004 | Hagai | H04N 19/159 382/238 |
| 2005/0041875 A1 | 2/2005 | Yamaguchi et al. | |
| 2005/0129306 A1* | 6/2005 | Wang | G06T 5/20 382/156 |
| 2005/0147167 A1* | 7/2005 | Dumitras | H04N 19/139 375/240.16 |
| 2005/0207496 A1* | 9/2005 | Komiya | H04N 19/105 375/240.16 |
| 2006/0132610 A1* | 6/2006 | Xin | H04N 19/597 348/207.99 |
| 2007/0005208 A1* | 1/2007 | Han | A01B 69/008 701/50 |
| 2007/0099490 A1 | 5/2007 | Takizawa | |
| 2008/0204592 A1* | 8/2008 | Jia | G06T 3/4007 348/402.1 |
| 2008/0267295 A1* | 10/2008 | Sung | H04N 19/436 375/240.24 |
| 2009/0034622 A1 | 2/2009 | Huchet et al. | |
| 2009/0238269 A1* | 9/2009 | Pandit | H04N 19/597 375/240.12 |
| 2009/0279615 A1 | 11/2009 | Au et al. | |
| 2012/0294362 A1 | 11/2012 | Sikora et al. | |
| 2013/0034169 A1 | 2/2013 | Sadafale et al. | |
| 2014/0028793 A1* | 1/2014 | Wiegand | H04N 13/111 348/42 |
| 2014/0254670 A1 | 9/2014 | Kwon et al. | |
| 2014/0286433 A1 | 9/2014 | He et al. | |
| 2015/0373328 A1 | 12/2015 | Yenneti et al. | |
| 2016/0316221 A1* | 10/2016 | Ikai | H04N 19/52 |
| 2017/0310983 A1 | 10/2017 | Gudumasu et al. | |
| 2017/0345130 A1 | 11/2017 | Wang et al. | |
| 2018/0139458 A1 | 5/2018 | Wang et al. | |

FOREIGN PATENT DOCUMENTS

| | | |
|---|---|---|
| EP | 1499134 A1 | 1/2005 |
| EP | 2375747 A1 | 10/2011 |
| EP | 2651137 A2 | 10/2013 |
| GB | 2531087 A | 4/2016 |
| KR | 100835662 B1 | 5/2008 |
| WO | 2011126278 A3 | 1/2012 |
| WO | 2015009068 A1 | 1/2015 |
| WO | 2015149699 A1 | 10/2015 |
| WO | 2016156864 A1 | 10/2016 |
| WO | 2017/178782 A1 | 10/2017 |
| WO | 2017/178827 A1 | 10/2017 |

OTHER PUBLICATIONS

Search Report for Application No. GB1606682.1, dated Oct. 24, 2016, 4 pages.
Search Report for Application No. GB1607884.2, dated Nov. 8, 2016, 4 pages.
Long, et al., "Learning Image Matching by Simply Watching Video", Computer Vision- ECCV 2016, Mar. 29, 2016, 21 pages.
Antenehayele, et al., "Review of Proposed High Efficiency Video Coding (HEVC) Standard", International Journal of Computer Applications, Dec. 18, 2012, pp. 1-9.
Kwon, et al., "Deblocking Algorithm in MPET-4 Video Coding Using Block Boundary Characteristics and Adaptive Filtering", IEEE International Conference on Image Processing, vol. 3, Sep. 11, 2005, pp. 541-544.
Lin, et al., "Deep Convolutional Neural Network for Decompressed Video Enhancement", 2016 Data Compression Conference, 2016 IEEE, p. 617.
Tsai, et al., "Adaptive Loop Filtering for Video Coding", IEEE Journal of Selected Topics in Signal Processing, vol. 7, No. 6, Dec. 1, 2013, pp. 934-945.

* cited by examiner

MOTION COMPENSATION USING TEMPORAL PICTURE INTERPOLATION

CROSS REFERENCE TO RELATED APPLICATIONS

This is a continuation of, and claims priority to, International Patent Application No. PCT/GB2017/000056, filed on Apr. 13, 2017, which claims priority to United Kingdom Application No. GB 1607884.2, filed on May 5, 2016 and claims priority to United Kingdom Application No. GB 1606682.1, filed on Apr. 15, 2016, all of which are incorporated herein by reference in their entireties.

TECHNICAL FIELD

The present disclosure relates to the creation of enhanced reference pictures for use in video encoding and decoding. More particularly, the present disclosure relates to the use of hierarchical algorithms to temporally interpolate enhanced reference pictures for use in video encoding and decoding.

BACKGROUND

Video Compression

FIG. 1 illustrates the generic parts of a video encoder. Video compression technologies reduce information in pictures by reducing redundancies available in the video data. This can be achieved by predicting the image (or parts thereof) from neighbouring data within the same frame (intraprediction) or from data previously signalled in other frames (interprediction). The interprediction exploits similarities between pictures in a temporal dimension. Examples of such video technologies include, but are not limited to, MPEG2, H.264, HEVC, VP8, VP9, Thor, and Daala. In general, video compression technology comprises the use of different modules. To reduce the data, a residual signal is created based on the predicted samples. Intra-prediction 121 uses previously decoded sample values of neighbouring samples to assist in the prediction of current samples. The residual signal is transformed by a transform module 103 (for example, Discrete Cosine Transform or Fast Fourier Transforms are used). This transformation allows the encoder to remove data in high frequency bands, where humans notice artefacts less easily, through quantisation 105. The resulting data and all syntactical data is entropy encoded 125, which is a lossless data compression step. The quantized data is reconstructed through an inverse quantisation 107 and inverse transformation 109 step. By adding the predicted signal, the input visual data 101 is re-constructed 113. To improve the visual quality, filters, such as a deblocking filter 111 and a sample adaptive offset filter 127 can be used. The picture is then stored for future reference in a reference picture buffer 115 to allow exploiting the difference static similarities between two pictures. It is also stored in a decoded picture buffer 129 for future output as a reconstructed picture 113. The motion estimation process 117 evaluates one or more candidate blocks by minimizing the distortion compared to the current block. One or more blocks from one or more reference pictures are selected. The displacement between the current and optimal block(s) is used by the motion compensation 119, which creates a prediction for the current block based on the vector. For interpredicted pictures, blocks can be either intra- or inter-predicted or both.

Interprediction exploits redundancies between frames of visual data. Reference frames are used to reconstruct frames that are to be displayed, resulting in a reduction in the amount of data required to be transmitted or stored. The reference frames are generally transmitted before the frames of the image to be displayed. However, the frames are not required to be transmitted in display order. Therefore, the reference frames can be prior to or after the current image in display order, or may even never be shown (i.e., an image encoded and transmitted for referencing purposes only). Additionally, interprediction allows using multiple frames for a single prediction, where a weighted prediction, such as averaging is used to create a predicted block.

FIG. 2 illustrates a schematic overview of the Motion Compensation (MC) process part of the interprediction. In motion compensation, reference blocks 201 from reference frames 203 are combined to produce a predicted block 205 of visual data. This predicted block 205 of visual data is subtracted from the corresponding input block 207 of visual data in the frame currently being encoded 209 to produce a residual block 211 of visual data. It is the residual block 211 of visual data, along with the identities of the reference blocks 203 of visual data, which are used by a decoder to reconstruct the encoded block of visual data 207. In this way the amount of data required to be transmitted to the decoder is reduced.

The Motion Compensation process has as input a number of pixels of the original image, referred to as a block, and one or more areas consisting of pixels (or subpixels) within the reference images that have a good resemblance with the original image. The MC subtracts the selected block of the reference image from the original block. To predict one block, the MC can use multiple blocks from multiple reference frames, through a weighted average function the MC process yield a single block that is the predictor of the block from the current frame. In an aspect, the frames transmitted prior to the current frame can be located before and/or after the current frame in display order.

The more similarities the predicted block 205 has with the corresponding input block 207 in the picture being encoded, the better the compression efficiency will be, as the residual block 211 will not be required to contain as much data. Therefore, matching the predicted block 205 as close as possible to the current picture is beneficial for good encoding performances. Consequently, finding the most optimal, or closely matching, reference blocks 201 in the reference pictures 203 is required which is known as motion estimation.

Hierarchical Groups of Pictures

To improve temporal prediction, multiple reference frames can be used. Therefore, the order in which the pictures are encoded can be changed such that pictures before and after the current picture in the display order of the pictures can be used for prediction. Such a structure is called a hierarchical group of pictures (GOP) structure, as the pictures are encoded in hierarchical layers.

FIG. 3 illustrates an example of a Hierarchical GOP. Pictures are arranged in display order from left to right, and each is labelled with a letter corresponding to its type. Type I (intra-coded) pictures are encoded independently of other pictures in the bit-stream, and do not require any inter-frame prediction in order to be reconstructed. Type P (predictive coded) pictures require previously reconstructed pictures in order to be reconstructed, and are reconstructed using motion compensation. Type B (bi-predictive coded) pictures require two reference pictures in order to be reconstructed. In some cases, these reference pictures can be temporally prior to and after themselves in display order.

The pictures are decoded in an order that is not identical to the display order of the pictures. In the example shown, the first picture encoded or decoded is the I picture, as it acts as a key frame from which others are generated, but does not require any other pictures for its own generation. The second picture encoded or decoded is the P picture, which occurs in display order at the end of the GOP. This requires knowledge of the I picture in order to be decoded. These two pictures form the zeroth layer of the hierarchical GOP.

The next picture in the decoding order is the central B picture, the fourth in the picture order count (POC). This picture requires information from both pictures in the zeroth layer in order to be reconstructed, and forms the first picture layer.

In the example shown, the picture decoded next lies between the I picture and the B picture in the first layer, requiring knowledge of both these pictures in order to be reconstructed. It is the second picture in display order, and forms one of the pictures in the second layer of the hierarchical GOP. It is used, along with the I picture and first layer B picture, to decode the first and third pictures in the display order. Once decoded, these pictures can be removed from the reference buffer, as the decoding of no other pictures depends on them.

The other B picture in the second layer of the hierarchical GOP is then decoded using the P picture and the B picture in the first layer. In the example shown, this is the sixth picture in display order. This picture is used, along with the P frame and first layer B frame, to decode B pictures that are fifth and seventh in the display order. Once decoded, these pictures and those in the other layers can be removed from the reference buffer, as the decoding of no other pictures depends on them.

Machine Learning Techniques

Machine learning is the field of study where a computer or computers learn to perform classes of tasks using the feedback generated from the experience or data gathered that the machine learning process acquires during computer performance of those tasks.

Machine learning can be broadly classed as supervised and unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and may use unlabelled data sets.

Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled.

Unsupervised machine learning may be applied to solve problems where an unknown data structure might be present in the data. As the data is unlabelled, the machine learning process is required to operate to identify implicit relationships between the data for example by deriving a clustering metric based on internally derived information.

Semi-supervised learning may be applied to solve problems where there is a partially labelled data set, for example where only a subset of the data is labelled. Semi-supervised machine learning makes use of externally provided labels and objective functions as well as any implicit data relationships.

When initially configuring a machine learning system the machine learning algorithm can be provided with some training data or a set of training examples, in which each example may be a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features. The user must also determine the desired structure of the learned or generalised function, for example whether to use support vector machines or decision trees.

SUMMARY

Aspects and/or embodiments seek to provide an improved method for generating enhanced reference pictures for use in encoding and decoding a hierarchical group of pictures.

According to a first aspect, there is provided a method of generating enhanced reference pictures in a video encoding and/or decoding process, the method comprising the steps of: receiving one or more known reference elements of video data from a reference picture buffer; generating, using one or more hierarchical algorithms, one or more additional reference elements of video data from the one or more known reference elements of video data; and outputting the one or more additional reference elements of video data; wherein the step of generating the one or more additional reference elements of video data from the one or more known reference elements of video data comprises the use of temporal interpolation.

By using a hierarchical algorithm, instead of a simple weighted average, to generate reference pictures or reference blocks for a picture being encoded, the accuracy of the reference picture can be increased. This can lead to a reduction in the size of the residual blocks required to reconstruct the picture being encoded, and consequently less data is required to be encoded. The hierarchical algorithm uses temporal interpolation to generate the reference pictures or blocks, which can lead to an increase in accuracy when compared with a weighted average. The generated additional reference elements can be a better prediction of elements of any input picture than any the currently available reference pictures stored in the reference buffer.

Optionally, the one or more known reference elements of video data comprises one or more known reference pictures of video data.

Taking whole known reference pictures as inputs to the hierarchical algorithm allows information from the whole known reference pictures to be used to generate a new reference frame.

Optionally, the one or more additional reference elements of video data comprises one or more additional reference pictures of video data.

Outputting a complete new reference picture from the hierarchical algorithm allows a complete new reference picture to be used or stored for future use.

Optionally, the one or more known reference elements of video data comprises one or more known reference blocks of video data.

Using blocks of video data from known reference pictures allows for the hierarchical algorithms to be applied on a block-by-block basis, which can increase the accuracy of the generated reference picture if multiple types of visual data are present.

Optionally, the one or more additional reference elements of video data comprises one or more additional reference blocks of video data.

Outputting new reference blocks of video data rather than a whole new reference image can allow for a static background to be updated. In this case, only the occlusions need to be generated and sent directly to the motion estimation/motion compensation process, reducing the required reference picture memory.

Optionally, the one or more known reference elements of video data comprises a plurality of known reference elements of video data.

Multiple known reference elements can be used as inputs to the hierarchical algorithms. This provides additional temporal data for the temporal interpolation, which can result in an increased accuracy of the generated reference image when compared with using a single known reference element as an input.

Optionally, one or more of the one or more additional reference elements of video data are temporally co-located with one or more of the one or more known reference elements of video data.

By having the output reference elements of video data temporally co-located with the known reference elements already in the reference picture buffer, the known reference elements can, in effect, be enhanced by using temporal interpolation.

Optionally, one or more of the one or more additional reference elements of video are temporally non-co-located with one or more of the one or more known reference elements of video data.

Predicting a non-temporally co-located picture from known reference pictures can result in having to encode less video data in the encoded bit stream.

Optionally, the one or more additional reference elements of video data are temporally intermediate between two or more known reference elements of video data.

Using known reference pictures that occur in display order before and after the input picture being predicted can result in an increased accuracy of the predicted additional reference frame, as temporal data from before and after the picture are available.

Optionally, the one or more additional reference elements of video data are temporally outside the interval of the two or more known reference elements of video data.

By using two or more known reference pictures in a sequence of reference pictures to generate a future reference frame.

Optionally, the one or more additional reference elements of video data are output to the reference picture buffer.

Storing the predicted additional reference picture in the reference picture buffer allows for them to be used in the prediction of future input pictures, and also allows them to be updated as knowledge of future input pictures becomes available.

Optionally, the method further comprises the step of updating the one or more additional reference elements of video data in the reference picture buffer based on knowledge of decoded data from input pictures of video data.

Further input pictures of video data can include additional temporal information that could improve the accuracy of the predicted additional reference frame. Allowing previously generated additional reference pictures to be updated when this knowledge becomes available is therefore advantageous.

Optionally, one or more of the one or more additional reference elements of video data are temporally co-located with an input picture of video data being encoded or decoded.

Predicting an additional reference frame that is temporally co-located with a current input picture allows motion compensation to be performed on the predicted picture directly. It also reduces the bit rate for the encoding of the temporally co-located picture.

Optionally, one or more of the one or more additional reference elements of video data are temporally non-co-located with an input picture of video data being encoded or decoded.

Predicting intermediate additional reference pictures that are temporally non-co-located with the current input picture can be useful in situations where only a limited amount of known reference pictures are available. Using intermediate pictures can also allow for the same additional reference picture to be used for two neighbouring input pictures with a limited overhead in terms of bit rate compared to using different reference pictures for each. This allows for enhanced bit rate behaviour, since the bit rate will be more regular.

Optionally, the one or more additional reference elements of video data are output to a motion compensation process.

Optionally, the method further comprises the step of performing the motion compensation process using two or more additional reference elements of video data, wherein one or more additional reference elements of video data are temporally non-co-located with an input picture being encoded.

Optionally, the method further comprising the step of performing the motion compensation process using two or more additional reference elements of video data and one or more of the two or more additional reference elements of video data are temporally co-located with the input picture being encoded.

Using the generated additional reference pictures in the motion compensation process instead of known reference pictures for the current input picture can result in a smaller set of residual blocks being necessary to encode the input picture when compared with using any of the known reference picture. This is because the temporally interpolated additional picture can be more similar to the current input picture than a weighted average of two known reference pictures.

In some implementations, the one or more additional reference elements of video data are output to a motion estimation process.

Using the calculated additional reference elements to determine a motion vector can result in a more efficient calculation when compared with using known reference frames, as the temporally interpolated new frame can be more similar to the current input frame than any of the known frames.

Optionally, the one or more additional reference elements of video data are adaptively output to a motion estimation process in dependence on a switching signal.

When the additional reference picture is sufficiently similar to the current input picture, no motion estimation is required, as motion compensation can be used directly on the additional reference picture. However, if the additional reference picture is not sufficiently similar to the input picture, motion estimation is required to estimate a motion vector. The ability to switch motion estimation on and off provides the flexibility to accommodate these two situations.

Optionally, the method further comprises the step of calculating a motion vector relating the one or more known reference elements of video data to one or more input elements of video data using the one or more hierarchical algorithms.

The motion estimation process can be combined with the temporal interpolation in the hierarchical algorithms by training the hierarchical algorithms on sets of pictures with known motion vectors between them. Estimating the motion vector while generating the temporally interpolated additional pictures can increase the computational efficiency of the method.

Optionally, the one or more known reference elements of video data comprises part of a hierarchical group of pictures.

Hierarchical groups of pictures can reduce the storage requirements when decoding data. Using a hierarchical algorithm that applies temporal interpolation to pictures in the hierarchical GOP can increase the accuracy of the prediction of pictures in higher layers of the hierarchical GOP when compared with using a weighted average.

Optionally, the method further comprises the additional step of applying to the one or more additional reference elements of video data at least one of: a deblocking filter; a Sample Adaptive Offset filter; an Adaptive Loop Filter; or a Wiener filter.

Visual artefacts, such as blocking and ringing, can be introduced during the processing of the pictures. Applying filters to the additional reference pictures once they have been generated can enhance the visual quality of the pictures by removing or smoothing out these artefacts.

Optionally, the one or more hierarchical algorithms are content specific.

Optionally, the one or more hierarchical algorithms chosen from a library of hierarchical algorithms based on metric data associated with the one or more known reference elements of video data.

Optionally, the one or more hierarchical algorithms chosen from a library of hierarchical algorithms based on metric data associated with one or more input pictures of video data.

Training content specific algorithms, then selecting them for use from a library based on either properties of the input pictures or known reference pictures, can increase the computational efficiency of the method when compared with the use of a generic hierarchical algorithm.

Optionally, the one or more hierarchical algorithms were developed using a learned approach.

Optionally, the learned approach comprises training the one or more hierarchical algorithms on known sets of reference pictures in hierarchical groups of pictures to substantially recreate pictures in higher hierarchical layers from those in lower layers of the hierarchical groups of pictures.

Optionally, the one or more hierarchical algorithms are updated based on knowledge of the one or more known reference elements of video data and the one or more additional reference elements of video data.

Optionally, the hierarchical algorithm is updated based on knowledge of one or more residual blocks calculated from the one or more additional reference elements of video data and one or more input elements of video data.

Optionally, the hierarchical algorithm comprises: a non-linear hierarchical algorithm; a neural network; a convolutional neural network; a layered algorithm; a recurrent neural network; a long short-term memory network; a 3D convolutional network; a memory network; or a gated recurrent network.

The use of any of a non-linear hierarchical algorithm; neural network; convolutional neural network; recurrent neural network; long short-term memory network; multi-dimensional convolutional network; a memory network; or a gated recurrent network allows a flexible approach when generating the additional reference elements. The use of an algorithm with a memory unit such as a long short-term memory network (LSTM), a memory network or a gated recurrent network can keep the state of the additional reference elements calculated for previous input frames in order to enhance the generation of future additional reference frames in the same sequence of pictures. The use of these networks can improve computational efficiency and also improve temporal consistency in the motion compensation process across a number of frames, as the algorithm maintains some sort of state or memory of the changes in motion. This can additionally result in a reduction of error rates.

Optionally, the method is performed at a node within a network.

Optionally, metadata associated with the one or more hierarchical algorithms is transmitted across the network.

Optionally, one or more of the one or more hierarchical algorithms are transmitted across the network.

When transmitting video data across a network, such as the interne, the method can be performed at the encoding and/or decoding nodes in order to reduce the amount of data required to be transmitted across the network. The encoder can transmit metadata identifying which hierarchical algorithms and/or settings the decoder needs to use to generate the additional reference frames, or alternatively can transmit the hierarchical algorithms to the decoder if they are not stored there.

Herein, the word picture is preferably used to connote an array of picture elements (pixels) representing visual data such as: a picture (for example, an array of luma samples in monochrome format or an array of luma samples and two corresponding arrays of chroma samples in, for example, 4:2:0, 4:2:2, and 4:4:4 colour format); a field or fields (e.g. interlaced representation of a half frame: top-field and/or bottom-field); or frames (e.g. combinations of two or more fields).

Herein, the word block can be used to connote a group of pixels, a patch of an image comprising pixels, or a segment of an image. This block may be rectangular, or may have any form, for example comprise an irregular or regular feature within the image. The block may potentially comprise pixels that are not adjacent.

BRIEF DESCRIPTION OF DRAWINGS

Embodiments will now be described, by way of example only and with reference to the accompanying drawings having like-reference numerals, in which.

DETAILED DESCRIPTION

Figure 4:
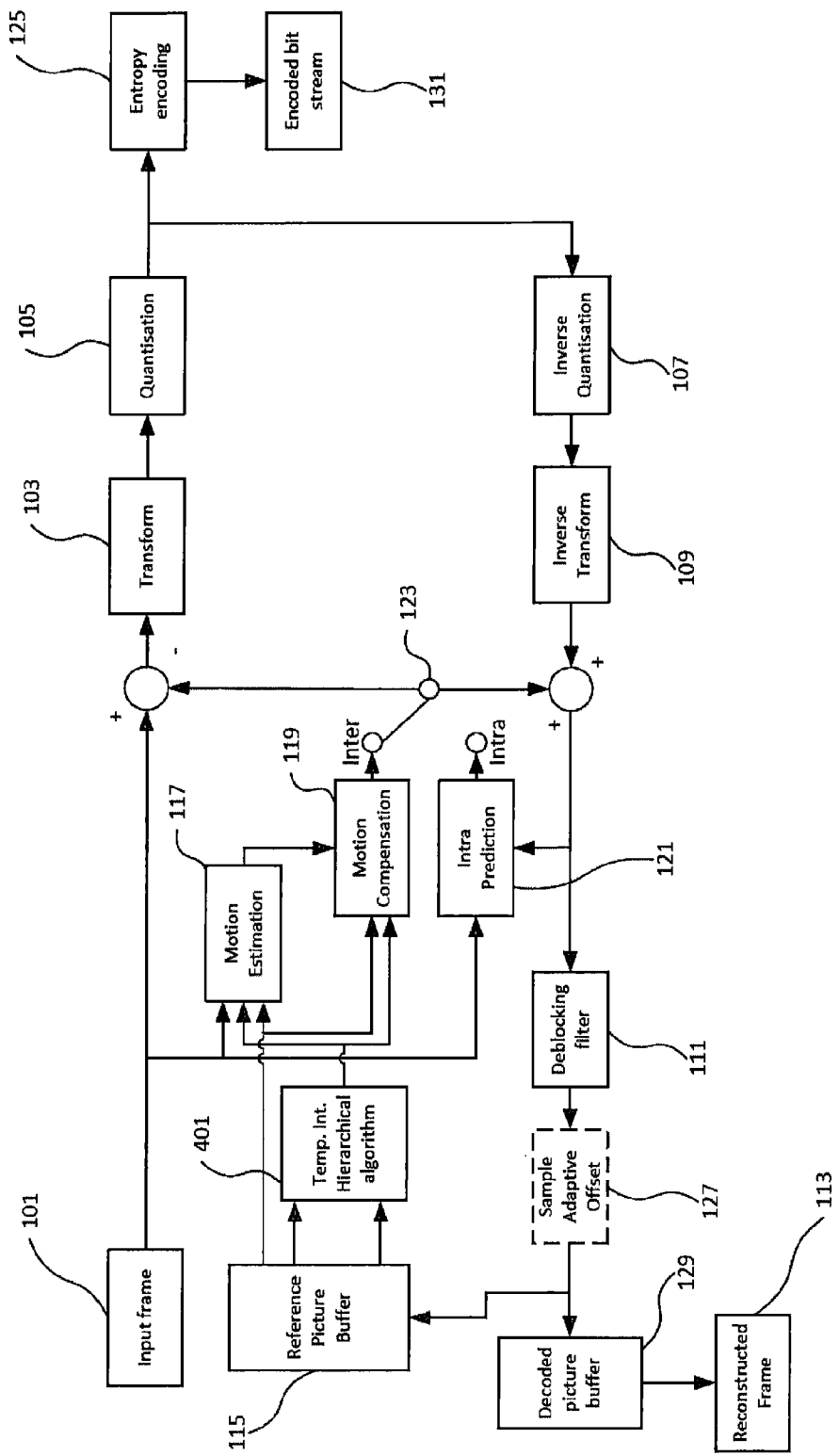
FIG. 4 illustrates an embodiment of an encoding process using a hierarchical algorithm for temporal interpolation.

Referring to FIG. 4, an embodiment of the motion compensation process will now be described.

FIG. 4 illustrates an embodiment of an encoding process using a hierarchical algorithm for temporal interpolation. Multiple input frames 101 are encoded to produce a hierarchical group of pictures (GOP) in the encoded bit stream 131. In order to improve the encoding, particularly the motion compensation process 119, a hierarchical algorithm is used to temporally interleave or interpolate pictures in the hierarchical GOP that are previously decoded and stored in a reference picture buffer 115.

Figure 1:
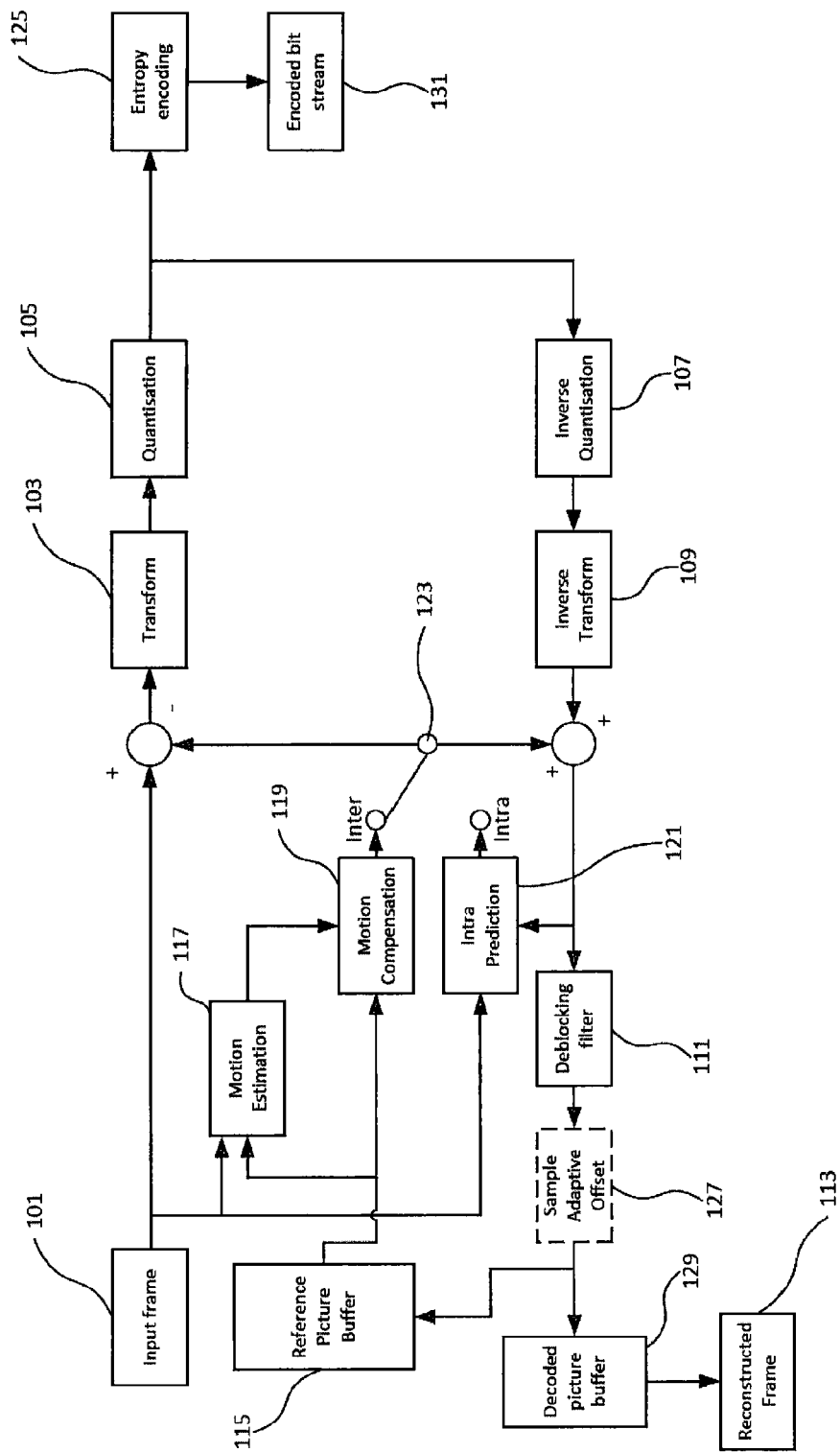
FIG. 1 illustrates the generic parts of a video encoder.
Figure 2:
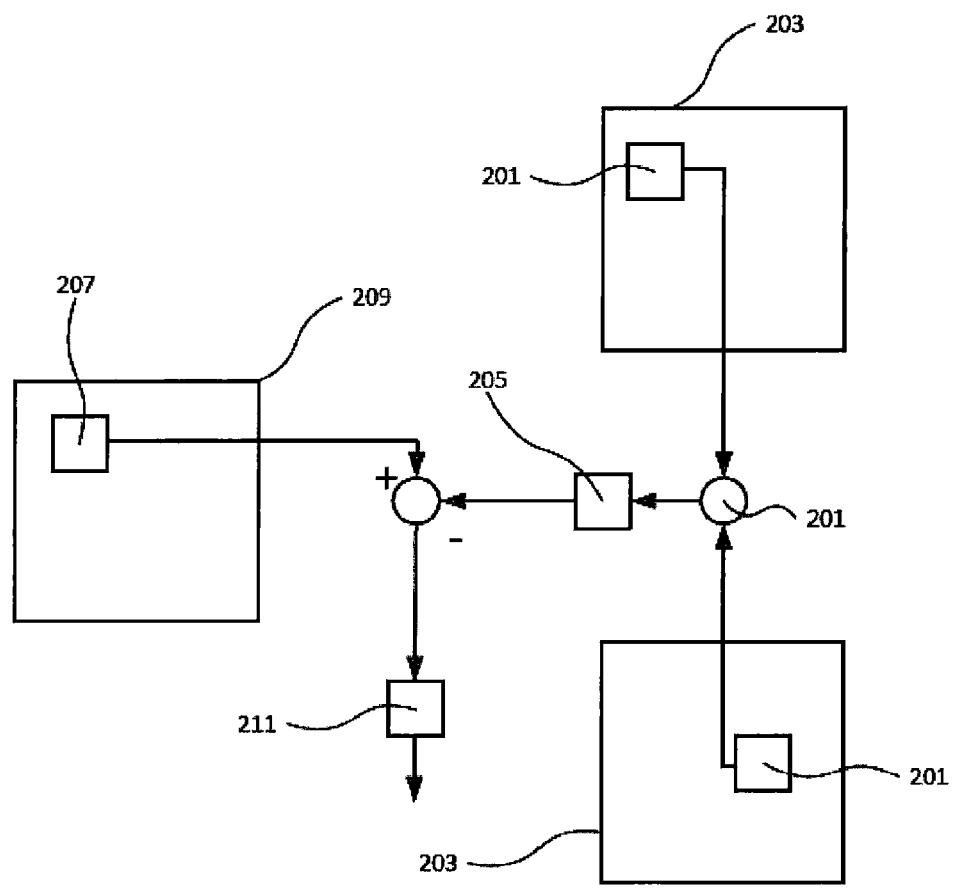
FIG. 2 illustrates a schematic overview of the Motion Compensation (MC) process part of the interprediction.
Figure 3:
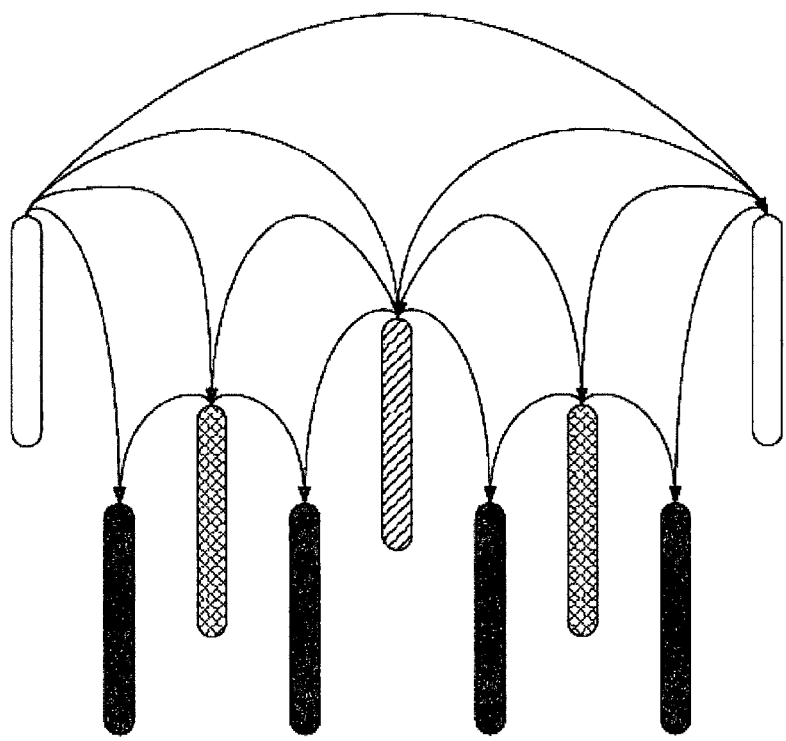
FIG. 3 illustrates an example of a Hierarchical GOP.

One or more previously decoded reference pictures are taken from the reference picture buffer 115 and input into a hierarchical algorithm 401. In the example shown, two reference pictures are used, though one reference picture or multiple reference pictures can be used. The hierarchical algorithm 401 performs a temporal interpolation of the input reference pictures, and outputs one or more additional reference pictures for use in the motion compensation process 119 and the motion estimation process 117 being performed on the current input frame 101. These generated additional reference pictures can be temporally co-located with the current input picture 101. Alternatively, the generated additional reference pictures can be at any other position in the bit stream, making them temporally non-co-located, including positions that have not yet been signalled and/or encoded. A further option is to output additional reference pictures that are not temporally co-located with any pictures in the bit stream, but are instead located between pictures, for example between POC 6 and POC 7 in the hierarchical GOP in FIG. 3, or outside the temporal range of the hierarchical GOP, for example before POC 0 or after POC 8 in FIG. 3. In general, the additional reference pictures do not have to be temporally symmetrically placed between the reference pictures from which they are generated; for example, the reference picture for POC 6 could be predicted from POC 0 and POC 8 in FIG. 3.

In some embodiments, the hierarchical algorithm 401 outputs a single additional reference picture to the motion compensation 119 and motion estimation 117 processes. The motion estimation process 117 then produces a motion estimation vector relating blocks in the additional reference picture to blocks in the input picture 101, and the motion compensation process 119 uses the single additional reference picture and the motion vector to generate set of residual blocks.

Alternatively, multiple reference pictures can be used in the motion estimation 117 and compensation 119 processes. The motion estimation process 117 will calculate motion vectors for each of these reference pictures, and output these to the motion compensation process 119. The motion compensation process 119 will use the calculated motion vectors, along with the multiple reference frames, to generate a set of residual blocks. The multiple reference pictures can comprise known reference pictures in addition to one or more additional reference pictures output by the hierarchical algorithm 401.

The hierarchical algorithms used to produce the additional reference pictures are pre-trained on known sets of reference pictures in hierarchical GOPs. The hierarchical algorithms are trained to substantially recreate the pictures in higher hierarchical layers from those in lower layers of the hierarchical GOPs.

Alternatively, the hierarchical algorithms can be trained on known sets of reference pictures in a sequence of pictures that are not in a hierarchical GOP structure in order to substantially reproduce one or more of the known reference pictures from one or more of the other known reference pictures.

A further training option is to train the hierarchical algorithms on previously decoded pictures, with a cost function relative to uncompressed pictures at the same temporal location as the decoded pictures.

The training aims at optimizing the algorithm using a cost function describing the difference between the output reference frames of the hierarchical algorithm and the known reference frames to which they correspond. Given the amount of training data, the training can be optimized through parallel and distributed training. The training may be performed in parallel or on a distributed network. Furthermore, the training might comprise of multiple iterations to optimize for different temporal positions of the picture relative to the reference pictures.

Once trained, the hierarchical algorithms are stored in a library of hierarchical algorithms for future retrieval, along with metadata relating to the hierarchical GOPs that they were trained on. The metadata can include, for example, any of: the type of content in the pictures in the hierarchical algorithm was trained on; the number of known reference frames required as an input; the layers of the hierarchical GOP that they have been trained to predict; the resolution of the pictures they were trained on; the framerate of the pictures they were trained on; and/or metric data relating to the pictures they were trained on. During the encoding process, this metadata is compared with metadata relating to the input frame 101 and the known reference frames stored in the reference buffer 115, and used to select which of the hierarchical algorithms stored in the library will be used to generate the additional reference pictures.

In some embodiments, the hierarchical algorithms can be updated to take advantage of the additional reference pictures produced. The additional reference pictures and the known reference pictures from which they were interpolated can be used as further training data to improve the performance of the hierarchical algorithms used for the interpolation, thereby updating them based on knowledge of the known reference pictures and additional reference pictures. During the updating of the hierarchical algorithm, not all additional reference pictures need to be used in the training. For example, only those additional reference pictures which are sufficiently close to their corresponding known reference pictures (as defined by a metric or cost function) may be used.

Alternatively or additionally, the residual blocks of data that reproduce the input picture from the additional reference pictures can be used to further train the hierarchical algorithm. The algorithm can be trained to produce an additional reference picture that minimises the size of the residual block of data. Residual blocks of data calculated during the encoding process can be used as further training data to update the hierarchical algorithms. The residual blocks used for the training may be chosen based on their size, for example by discarding the residual blocks that had a size above some pre-defined limit, to ensure that additional reference pictures that produced large residual blocks are not used in the training.

In some embodiments, the hierarchical algorithm acts in a similar way to a temporal upscaling filter that is used for frame rate conversion.

Figure 5:
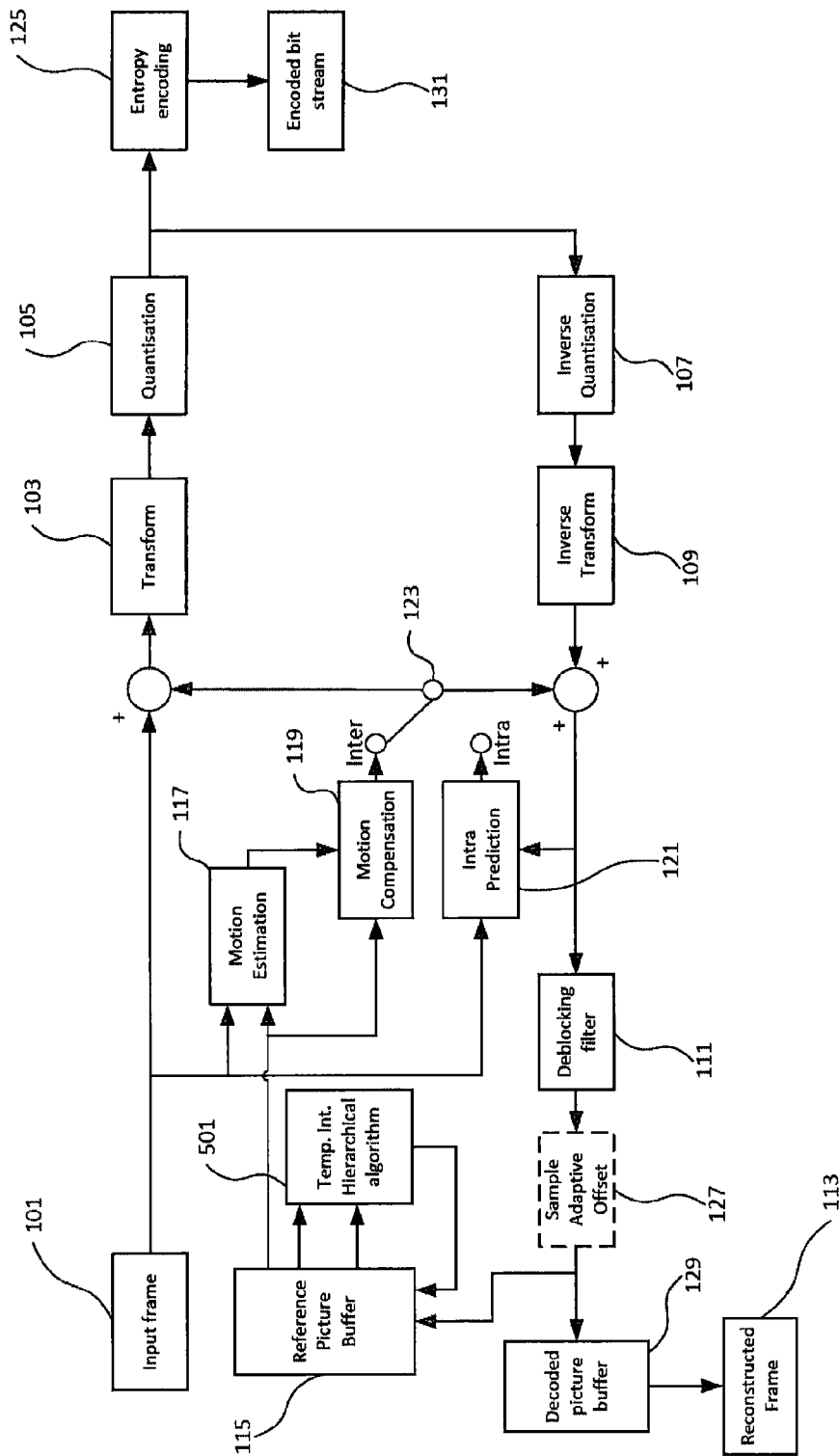
FIG. 5 illustrates an alternative embodiment of an encoding process using a hierarchical algorithm for temporal interpolation.

FIG. 5 illustrates an alternative embodiment of an encoding process using a hierarchical algorithm for temporal interpolation. Multiple input frames are encoded to produce a hierarchical group of pictures (GOP) in the encoded bit stream. In order to improve the encoding a hierarchical algorithm 501 is used to temporally interleave previously decoded pictures and store them in the reference picture buffer 115. The additional reference pictures will then be available as a reference for the current input frame 101 being encoded, as well as for future input frames too. These generated additional reference pictures can be temporally co-located with the current input picture 101. Alternatively, the generated additional reference pictures can be at any other position in the bit stream, making them temporally non-co-located, including positions that have not yet been signalled and/or encoded. A further option is to output additional reference pictures that are not temporally co-located with any pictures in the bit stream, but are instead located between pictures, for example between POC 6 and POC 7 in FIG. 3. In general, the additional reference pictures do not have to be temporally symmetrically placed between the reference pictures from which they are generated; for example, the reference picture for POC 6 could be predicted from POC 0 and POC 8 in FIG. 3.

The output additional reference picture can also be temporally co-located with one of the input reference pictures. In this way, the currently used known reference picture can be enhanced, for example by using knowledge of further known reference frames that are not temporally co-located with the current known reference frame. Furthermore, this can allow for the known reference frames to be continually updated or optimised during the encoding process as knowledge of more input frames becomes available. The updates generated in this way, or instructions relating to how to generate them, can be included in the encoded bit stream in order to signal to the decoder how to generate these updates. Alternatively, these instructions could be signalled in a sideband as metadata for an app.

The hierarchical algorithm 501 takes as an input one or more reference pictures from the reference picture buffer 115. In the embodiment shown, two reference pictures are used as an input. The hierarchical algorithm 501 performs a temporal interpolation on the input reference frames, and outputs a new reference picture to the reference picture buffer 115.

When stored in the reference buffer 115, the generated additional reference frames can have reference control operations applied to them. This allows them to be stored in the reference picture buffer 115 for an increased length of time, such that they can be used for future input pictures 101, and ensures that the newly created additional reference frames can be used just like regular reference frames. Thus, the stored additional reference pictures can be used as inputs to the hierarchical algorithm for future input frames 101, and in doing so can be updated based on knowledge of these future input frames.

The embodiment of FIG. 5 can be combined with that of FIG. 4, such that the hierarchical algorithm outputs a generated additional reference frame to the motion compensation process 119, motion estimation process 117, and reference picture buffer 115.

In both the embodiments shown in FIGS. 4 and 5, the motion estimation process can be adaptively switched on and off, using a signalling mechanism that instructs the motion estimation process not to be performed on the newly created additional reference picture. This would result in only blocks of the additional reference picture that are spatially co-located with the blocks in the input picture being used in the motion compensation process. For a sufficiently well-trained hierarchical algorithm, the generated additional reference frame will be sufficiently closely similar to the input frame that the motion compensation process will be able to produce residual blocks of data without requiring the use of a translation between the additional reference frame and the input frame. In effect, the translation between required between the known reference frames and the input frame is implemented by the hierarchical algorithm when producing the additional reference pictures.

Figure 6:
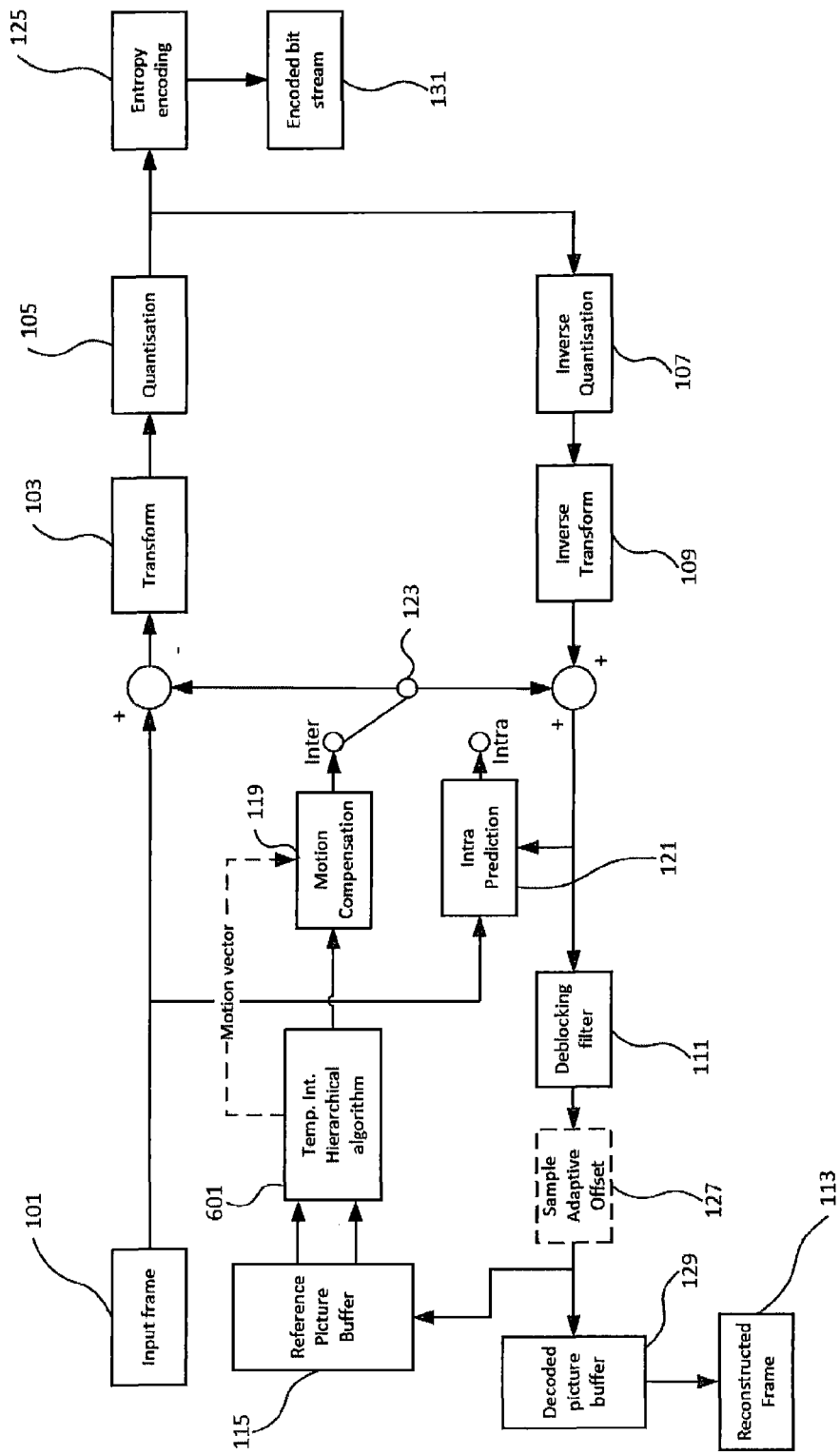
FIG. 6 illustrates an embodiment of an encoding process using a hierarchical algorithm for temporal interpolation and motion estimation.

FIG. 6 illustrates an embodiment of an encoding process using a hierarchical algorithm for temporal interpolation and motion estimation. In this embodiment, one or more known reference frames from the reference buffer 115 are used as input to a hierarchical algorithm 601, which outputs a temporally intermediate reference frame and a motion vector to the motion compensation process 119. Here, the generation of some form of motion vector is an intrinsic part of the hierarchical algorithm 601.

The hierarchical algorithms 601 used in this embodiment are trained on known sets of pictures in a temporal sequence, with a known approximate motion vector between at least some of the pictures in the sequence. The sequence of pictures can be part of a hierarchical GOP, in which case additional information, such as the layer of each picture in the GOP, can be used to enhance the training. Alternatively, the pictures are not arranged in a hierarchical GOP structure.

The training aims at optimizing the algorithm using a cost function describing the difference between the output reference frames of the hierarchical algorithm and the known reference frames to which they correspond. Given the amount of training data, the training can be optimized through parallel and distributed training. The training may be performed in parallel or on a distributed network. Furthermore, the training might comprise of multiple iterations to optimize for different temporal positions of the picture relative to the reference pictures.

Once trained, the hierarchical algorithms are stored in a library of hierarchical algorithms for future retrieval, along with metadata relating to the sets of pictures that they were trained on. The metadata can include, for example, any of: the type of content in the pictures in the hierarchical algorithm was trained on; the number of known reference frames required as an input; the layers of the hierarchical GOP that they have been trained to predict; the resolution of the pictures they were trained on; the framerate of the pictures they were trained on; and/or metric data relating to the pictures they were trained on. During the encoding process, this metadata is compared with metadata relating to the input frame 101 and the known reference frames stored in the reference buffer 115, and used to select which of the hierarchical algorithms stored in the library will be used to generate the additional reference pictures.

In the embodiments shown in FIGS. 4 to 6, the hierarchical algorithm is used to generate additional reference pictures during the encoding process. However, the use of the hierarchical algorithms to generate additional enhanced reference pictures from known reference pictures, such as previously decoded pictures, can equally be applied to at a decoder. At the decoder, reference images from a reference picture buffer are used as inputs for the hierarchical algorithm, and the resulting additional reference picture is output to the motion compensation process and/or back to the reference buffer. As no motion estimation process is required at the decoder, since the motion vector is either signalled to the encoder in the encoded bit stream, generated by the hierarchical algorithm itself, or not required, there is no need to output the additional reference frame to a motion estimation process.

When being used at a decoder, the identity of the hierarchical algorithm or algorithms required to generate the additional reference frames can be signalled to the decoder in the encoded bit stream or in a side channel of metadata as a library reference. The library reference is used at the decoder to select the relevant hierarchical algorithm from a library of hierarchical algorithms stored at the decoder which is substantially identical to the library of hierarchical algorithms stored at the encoder.

Alternatively, the required hierarchical algorithms can be transmitted to the decoder, either in the encoded bit stream with the encoded video pictures, or in a side channel. A combination of this and the library reference method described in the previous paragraph can be used in situations when only some of the required hierarchical algorithms are known to be stored at the decoder.

Where the encoder has updated previously generated additional reference frames during the encoding process, these updates will be signalled to the decoder either in the encoded bit stream or as metadata in a sideband.

In any of the embodiments described above, the hierarchical algorithm can be applied individually to elements of the known reference pictures, such as blocks of video data, groups of blocks of video data or elements within the known reference pictures, rather than to the whole known reference image. The input to the hierarchical algorithm can in these cases then be either the full known reference pictures, or just the particular elements undergoing the temporal interpolation. The hierarchical algorithm will then output the generated additional reference elements, not complete additional reference pictures. These generated additional reference elements can be either temporally co-located or temporally non-co-located with any of the known reference elements used as inputs for the hierarchical algorithm. They may also be temporally co-located or temporally non-co-located with any of the input frames being encoded.

All of the above embodiments can be performed at a node within a network, such as a server connected to the internet, with an encoded bit stream generated by the overall encoding process being transmitted across the network to a further node, where the encoded bit stream can be decoded by a decoder present at that node. The encoded bit stream can contain data relating to the hierarchical algorithm or algorithms used in the encoding process, such as a reference identifying which hierarchical algorithms stored in a library at the receiving node are required, or a list of coefficients for a known hierarchical algorithm. This data can alternatively be signalled in a sideband, such as metadata in an app. If a referenced hierarchical algorithm is not present at the receiving/decoding node, then the node retrieves the algorithm from the transmitting node, or any other network node at which it is stored.

Furthermore, the hierarchical algorithms in each of the above embodiments can be trained to apply additional filtering on the generated additional reference block or picture. This can be used to remove blocking and blurring artefacts that arise as a consequence of any underperformance in a simple hierarchical algorithm. Such filters include, but are not limited to: a deblocking filter; a Sample Adaptive Offset filter; an Adaptive Loop Filter; or a Wiener filter.

Any aspect of the method described herein can be implemented in hardware or software.

Any system feature as described herein may also be provided as a method feature, and vice versa. As used herein, means plus function features may be expressed alternatively in terms of their corresponding structure.

Any feature in one aspect of the disclosure may be applied to other aspects of the disclosure, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the disclosure can be implemented and/or supplied and/or used independently.

Some of the example embodiments are described as processes or methods depicted as diagrams. Although the diagrams describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the diagrams, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 7:
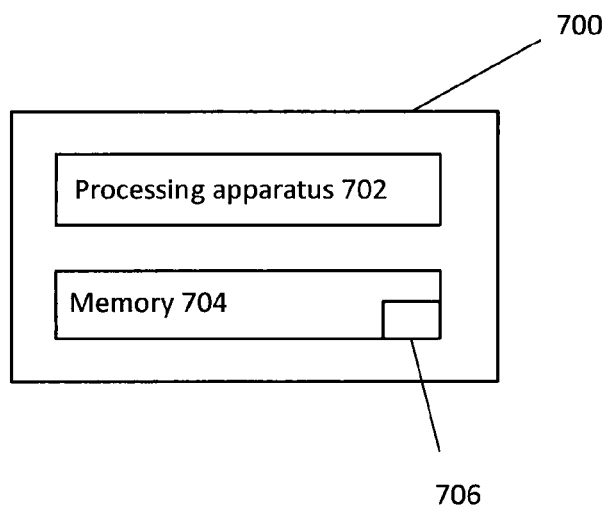
FIG. 7 shows an apparatus 700 comprising a processing apparatus 702 and memory 704 according to an embodiment.

FIG. 7 shows an apparatus 700 comprising a processing apparatus 702 and memory 704 according to an embodiment. Computer-readable code 706 may be stored on the memory 704 and may, when executed by the processing apparatus 702, cause the apparatus 700 to perform methods as described here, for example a method with reference to FIGS. 4 to 6.

The processing apparatus 702 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 702 is coupled to the memory 704 and is operable to read/write data to/from the memory 704. The memory 704 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further implementations are summarized in the following examples:

EXAMPLE 1

A method of generating enhanced reference pictures in a video encoding and/or decoding process, the method comprising the steps of:

receiving one or more known reference elements of video data from a reference picture buffer;

generating, using one or more hierarchical algorithms, one or more additional reference elements of video data from the one or more known reference elements of video data; and outputting the one or more additional reference elements of video data;

wherein the step of generating the one or more additional reference elements of video data from the one or more known reference elements of video data comprises the use of temporal interpolation.

EXAMPLE 2

A method according to example 1, wherein the one or more known reference elements of video data comprises one or more known reference pictures of video data.

EXAMPLE 3

A method according to examples 1 or 2, wherein the one or more additional reference elements of video data comprises one or more additional reference pictures of video data.

EXAMPLE 4

A method according to any preceding example, wherein the one or more known reference elements of video data comprises one or more known reference blocks of video data.

EXAMPLE 5

A method according to any preceding example, wherein the one or more additional reference elements of video data comprises one or more additional reference blocks of video data.

EXAMPLE 6

A method according to any preceding example, wherein the one or more known reference elements of video data comprises a plurality of known reference elements of video data.

EXAMPLE 7

A method according to any preceding example, wherein one or more of the one or more additional reference elements of video data are temporally co-located with one or more of the one or more known reference elements of video data.

EXAMPLE 8

A method according to any of examples 1 to 6, wherein one or more of the one or more additional reference elements of video are temporally non-co-located with one or more of the one or more known reference elements of video data.

EXAMPLE 9

A method according to example 8, wherein the one or more additional reference elements of video data are temporally intermediate between two or more known reference elements of video data.

EXAMPLE 10

A method according to example 8, wherein the one or more additional reference elements of video data are temporally outside the interval of the two or more known reference elements of video data.

EXAMPLE 11

A method according to any preceding example, wherein the one or more additional reference elements of video data are output to the reference picture buffer.

EXAMPLE 12

A method according to example 11, further comprising the step of updating the one or more additional reference elements of video data in the reference picture buffer based on knowledge of decoded data from input pictures of video data.

EXAMPLE 13

A method according to any preceding example, wherein one or more of the one or more additional reference elements of video data are temporally co-located with an input picture of video data being encoded or decoded.

EXAMPLE 14

A method according to any of examples 1 to 12, wherein one or more of the one or more additional reference elements of video data are temporally non-co-located with an input picture of video data being encoded or decoded.

EXAMPLE 15

A method according to any preceding example, wherein the one or more additional reference elements of video data are output to a motion compensation process.

EXAMPLE 16

A method according to example 15, further comprising the step of performing the motion compensation process using two or more additional reference elements of video data, wherein one or more additional reference elements of video data are temporally non-co-located with an input picture being encoded.

EXAMPLE 17

A method according to example 15, further comprising the step of performing the motion compensation process using two or more additional reference elements of video data, wherein one or more of the two or more additional reference elements of video data are temporally co-located with the input picture being encoded.

EXAMPLE 18

A method according to any preceding example, wherein the one or more additional reference elements of video data are output to a motion estimation process.

EXAMPLE 19

A method according to any preceding example, wherein the one or more additional reference elements of video data are adaptively output to a motion estimation process in dependence on a switching signal.

EXAMPLE 20

A method according to any of examples 1 to 17, further comprising the step of calculating a motion vector relating the one or more known reference elements of video data to one or more input elements of video data using the one or more hierarchical algorithms.

EXAMPLE 21

A method according to any preceding example, wherein the one or more known reference elements of video data comprises part of a hierarchical group of pictures.

EXAMPLE 22

A method according to any preceding example, further comprising the additional step of applying to the one or more additional reference elements of video data at least one of: a deblocking filter; a Sample Adaptive Offset filter; an Adaptive Loop Filter; or a Wiener filter.

EXAMPLE 23

A method according to any preceding example, wherein the one or more hierarchical algorithms are content specific.

EXAMPLE 24

A method according to any preceding example, wherein the one or more hierarchical algorithms chosen from a library of hierarchical algorithms based on metric data associated with the one or more known reference elements of video data.

EXAMPLE 25

A method according to any preceding example, wherein the one or more hierarchical algorithms are chosen from a library of hierarchical algorithms based on metric data associated with one or more input pictures of video data.

EXAMPLE 26

A method according to any preceding example, wherein the one or more hierarchical algorithms were developed using a learned approach.

EXAMPLE 27

A method according to example 26, wherein the learned approach comprises training the one or more hierarchical algorithms on known sets of reference pictures in hierarchical groups of pictures to substantially recreate pictures in higher hierarchical layers from those in lower layers of the hierarchical groups of pictures.

EXAMPLE 28

A method according to examples 26 or 27, wherein the one or more hierarchical algorithms are updated based on knowledge of the one or more known reference elements of video data and the one or more additional reference elements of video data.

EXAMPLE 29

A method according to examples 26 to 28, wherein hierarchical algorithm is updated based on knowledge of one or more residual blocks calculated from the one or more additional reference elements of video data and one or more input elements of video data.

EXAMPLE 30

A method according to any preceding example, wherein the hierarchical algorithm comprises: a nonlinear hierarchical algorithm; a neural network; a convolutional neural network; a layered algorithm; a recurrent neural network; a long short-term memory network; a 3D convolutional network; a memory network; or a gated recurrent network.

EXAMPLE 31

A method according to any preceding example, wherein the method is performed at a node within a network.

EXAMPLE 32

A method according to example 31, wherein metadata associated with the one or more hierarchical algorithms is transmitted across the network.

EXAMPLE 33

A method according to example 31 or 32, wherein one or more of the one or more hierarchical algorithms are transmitted across the network.

EXAMPLE 34

An apparatus substantially as hereinbefore described in relation to FIGS. 4 to 6.

EXAMPLE 35

Apparatus comprising:
at least one processor;
at least one memory including computer program code which, when executed by the at least one processor, causes the apparatus to perform the method of any one of examples 1 to 34.

EXAMPLE 36

A computer readable medium having computer readable code stored thereon, the computer readable code, when executed by at least one processor, causing the performance of the method of any one of examples 1 to 34.

What is claimed is:

1. A method of generating enhanced reference pictures in a video encoding or decoding process, comprising: receiving one or more known reference elements of video data from a reference picture buffer, wherein the one or more known references elements include part of a hierarchical group of pictures (GOP);
generating, using a neural network, one or more additional reference elements of video data from the one or more known reference elements of video data, wherein the neural network has been trained on known sets of reference pictures in hierarchical GOPs to recreate pictures in higher hierarchical layers of the hierarchical GOPs from pictures in lower layers of the hierarchical GOPs;
and outputting, from the neural network, the one or more additional reference elements of video data;
wherein the generating the one or more additional reference elements of video data from the one or more known reference elements of video data comprises use of temporal interpolation.

2. A method according to claim 1, wherein the one or more known reference elements of video data comprises one or more known reference pictures of video data.

3. A method according to claim 1, wherein the one or more additional reference elements of video data comprises one or more additional reference pictures of video data.

4. A method according to claim 1, wherein the one or more known reference elements of video data comprises one or more known reference blocks of video data.

5. A method according to claim 1, wherein the one or more additional reference elements of video data comprises one or more additional reference blocks of video data.

6. A method according to claim 1, wherein the one or more known reference elements of video data comprises a plurality of known reference elements of video data.

7. A method according to claim 1, wherein one or more of the one or more additional reference elements of video data are temporally co-located with one or more of the one or more known reference elements of video data.

8. A method according to claim 1, wherein one or more of the one or more additional reference elements of video are temporally non-co-located with one or more of the one or more known reference elements of video data.

9. A method according to claim 8, wherein the one or more additional reference elements of video data are temporally intermediate between two or more known reference elements of video data.

10. A method according to claim 8, wherein the one or more additional reference elements of video data are temporally outside the interval of the two or more known reference elements of video data.

11. A method according to claim 1, wherein the one or more additional reference elements of video data are output to the reference picture buffer.

12. A method according to claim 11, further comprising updating the one or more additional reference elements of video data in the reference picture buffer based on knowledge of decoded data from input pictures of video data.

13. A method according to claim 1, wherein one or more of the one or more additional reference elements of video data are temporally co-located with an input picture of video data being encoded or decoded.

14. A method according to claim 1, wherein one or more of the one or more additional reference elements of video data are temporally non-co-located with an input picture of video data being encoded or decoded.

15. A method according to claim 1, wherein the one or more additional reference elements of video data are output to a motion compensation process.

16. A method according to claim 15, further comprising performing the motion compensation process using two or more additional reference elements of video data, wherein one or more additional reference elements of video data are temporally non-co-located with an input picture being encoded.

17. A method according to claim 15, further comprising performing the motion compensation process using two or more additional reference elements of video data, wherein one or more of the two or more additional reference elements of video data are temporally co-located with the input picture being encoded.

18. A method according to claim 1, wherein the one or more additional reference elements of video data are output to a motion estimation process.

19. An apparatus for generating enhanced reference pictures in a video encoding or decoding process, comprising: at least one processor; at least one memory including computer program code which, when executed by the at least one processor, causes the apparatus to: receive one or more known reference elements of video data from a reference picture buffer, wherein the one or more known references elements include part of a hierarchical group of pictures (GOP);

generate, using a neural network, one or more additional reference elements of video data from the one or more known reference elements of video data, wherein the neural network has been trained on known sets of reference pictures in hierarchical GOPs to recreate pictures in higher hierarchical layers of the hierarchical GOPs from pictures in lower layers of the hierarchical GOPs; and output, from the neural network, the one or more additional reference elements of video data; wherein generating the one or more additional reference elements of video data from the one or more known reference elements of video data comprises use of temporal interpolation.

20. A computer readable medium having computer readable code stored thereon for generating enhanced reference pictures in a video encoding or decoding process, the computer readable code, when executed by at least one processor, cause the at least one processor to:

receive one or more known reference elements of video data from a reference picture buffer;

generate, using one or more hierarchical algorithms, one or more additional reference elements of video data from the one or more known reference elements of video data, wherein the one or more hierarchical algorithms are trained on known sets of reference pictures in hierarchical Groups of Pictures (GOPs) or previously decoded pictures; and output the one or more additional reference elements of video data;

wherein generating the one or more additional reference elements of video data from the one or more known reference elements of video data comprises use of temporal interpolation.

* * * * *